United States Patent
Braghiroli et al.

(10) Patent No.: US 9,725,287 B2
(45) Date of Patent: Aug. 8, 2017

(54) LIFTING APPARATUS FOR VEHICLE WHEELS

(71) Applicant: SNAP-ON EQUIPMENT S.r.l., Correggio (IT)

(72) Inventors: Francesco Braghiroli, Reggio Emilia (IT); Gianluca Cavalli, Modena (IT); Paolo Sotgiu, Modena (IT); Marco Tralli, Modena (IT)

(73) Assignee: Snap-On Equipment S.R.L., Correggio (RE) (IT)

( * ) Notice: Subject to any disclaimer, the term of this patent is extended or adjusted under 35 U.S.C. 154(b) by 0 days.

(21) Appl. No.: 14/673,778

(22) Filed: Mar. 30, 2015

(65) Prior Publication Data
US 2015/0274494 A1    Oct. 1, 2015

(30) Foreign Application Priority Data

Apr. 1, 2014 (IT) .............................. BO2014A0183

(51) Int. Cl.
*G01M 1/02* (2006.01)
*G01M 1/06* (2006.01)
(Continued)

(52) U.S. Cl.
CPC ............ *B66F 3/00* (2013.01); *B60C 25/0521* (2013.04); *B60C 25/0548* (2013.04);
(Continued)

(58) Field of Classification Search
USPC ......................................................... 73/487
See application file for complete search history.

(56) References Cited

U.S. PATENT DOCUMENTS 5,606,127 A * 2/1997 Humber .................. G01M 1/02
73/462
8,205,494 B2 * 6/2012 Nicolini .................. G01M 1/02
73/462
(Continued)

FOREIGN PATENT DOCUMENTS

DK    WO 9108163 A1 *  6/1991 ............ G01M 1/045
EP    1724563 A2   11/2006
(Continued)

OTHER PUBLICATIONS

Search Report issued in Italian Application No. BO2014A000183 dated Oct. 14, 2014, 7 pgs.

*Primary Examiner* — Lisa Caputo
*Assistant Examiner* — Jamel Williams
(74) *Attorney, Agent, or Firm* — McDermott Will & Emery LLP

(57) ABSTRACT

A lifting apparatus for a vehicle wheel comprising a wheel support which is selectively movable in order to lift or lower a vehicle wheel which is positioned thereon. An actuator group is connected to the wheel support in order to actuate the lifting and lowering thereof. A control unit is operationally connected to the actuator group in order to control the actuation. A lifting sensor member is provided to detect the height of the wheel support. At least one actuation instruction brings about the actuation of the actuator group in order to lift the wheel support from a lowered rest position to a predetermined lifting position, which is detected by the lifting sensor member.

16 Claims, 8 Drawing Sheets

(51) Int. Cl.
*G01M 17/02* (2006.01)
*B66F 3/00* (2006.01)
*B66F 13/00* (2006.01)
*B60C 25/05* (2006.01)
*B65D 75/58* (2006.01)
*B65D 85/10* (2006.01)

(52) U.S. Cl.
CPC ..... *B65D 75/5838* (2013.01); *B65D 85/1027* (2013.01); *B65D 85/1045* (2013.01); *B66F 13/00* (2013.01); *G01M 1/02* (2013.01)

(56) References Cited

U.S. PATENT DOCUMENTS

| | | | |
|---|---|---|---|
| 9,329,104 B2* | 5/2016 | Koide | G01M 17/022 |
| 2006/0016258 A1* | 1/2006 | Williams | G01M 1/045 |
| | | | 73/462 |
| 2011/0069323 A1* | 3/2011 | Takahashi | G01B 11/25 |
| | | | 356/625 |
| 2015/0274494 A1* | 10/2015 | Braghiroli | B66F 3/00 |
| | | | 73/487 |

FOREIGN PATENT DOCUMENTS

| | | | | |
|---|---|---|---|---|
| EP | 2113761 A2 | | 11/2009 | |
| IT | EP 2113761 A2 * | | 11/2009 | B60B 29/001 |
| WO | 91/08163 A1 | | 6/1991 | |

* cited by examiner

LIFTING APPARATUS FOR VEHICLE WHEELS

RELATED APPLICATIONS

This application claims the benefit of Italian Application No. BO2014A000183, filed on Apr. 1, 2014, the disclosure of which is incorporated by reference herein.

FIELD OF THE INVENTION

The present invention relates to a lifting apparatus for vehicle wheels. The invention also relates to such a lifting apparatus which is connected to a balancing machine or tyre changer. The invention further relates to a method for lifting a vehicle wheel with such a lifting apparatus.

TECHNOLOGICAL BACKGROUND

The lifting of the wheels of vehicles, and more generally the movement thereof not during travel, is an activity which is troublesome, laborious and potentially risky to the health and the safety of the operators owing to the weight, which at times is also substantial, of the vehicle wheels. In repair garages, bodyshops and at tyre repair workshops, there are used balancing machines, tyre changing machines and other auxiliary technical machines for the vehicle, which provide for the lifting of the vehicle wheels to a given height, and the positioning thereof on supports which are provided for the purpose on the machines. In order to fulfil those objectives, there have been developed apparatuses which allow lifting, and more generally movement, of vehicle wheels including wheels of considerable weight, reducing the effort of the operator with a series of safeguards with respect to the safety of the operation. Those apparatuses also allow centering of the vehicle wheel on a support, for example, of a balancing machine.

An example of a lifting apparatus is described in US 2013/0277632. It comprises a support plane for a vehicle wheel which can be lifted and lowered as a result of a scissor type articulation which has creeping trucks and which is controlled by a pneumatic piston type actuator, whose shaft is provided at the end thereof with a bearing which presses the scissor type articulation in accordance with, at the same time, a cam-like profile so as to reduce the lifting force for the operator. Such a lifting apparatus requires a compressed air supply source. It is also rather complex and readily subjected to wear owing to the creeping trucks of the scissor type articulation and the pressure mechanism with the bearing which follows the cam-like profile. It is further not very flexible in terms of operation, because the pressure parameters are predetermined and can be modified only with difficulty by the operator, who can act only on the air pressure in the piston type actuator, but cannot modify the cylinder capacity, nor the profile of the cam.

Another example of a known lifting apparatus is described in U.S. Pat. No. 8,205,494, wherein it is connected to a balancing machine for vehicle wheels. This lifting apparatus also comprises a support plane for a vehicle wheel which can be lifted and lowered as a result of a scissor type articulation which has creeping trucks. A processing unit provides for control of the lifting action of the vehicle wheel up to a height at which the hub thereof is aligned with the support shaft of the balancing machine. The reaching of the exact height is established by a sensor which is placed on the balancing machine and which operates in accordance with two different methods depending on where it is positioned. According to a first configuration, the sensor is positioned at the same height as the support shaft of the balancing machine, and reads, transversely relative to the plane of the vehicle wheel, the distance of the tread band of the tyre. When that distance is at a minimum, the hub of the wheel is at the same height as the support shaft of the balancing machine, and in that position the stopping of the lifting apparatus is brought about. In the alternative, the sensor is placed on a wheel protection screen, in the vertical of the support shaft. The sensor initially reads the distance between the base, on which the wheel is supported, and the tip of the tyre thereof, so as to calculate the diameter of the wheel, and the position of the hub. While the wheel is lifted, the sensor reads the distance from the tread band and brings about the stopping of the lifting action when the hub has reached the height of the support shaft. Such a lifting apparatus is also readily subjected to wear as a result of the creeping trucks of the scissor type articulation. Furthermore, the lifting and lowering operations are slow and they require continuous processing of the data from the sensor. An error of the sensor during measurement of the height of the wheel or the distance from the tread band thereof may compromise the correct alignment of the wheel on the support shaft of the balancing machine, with a further resultant loss of time. Furthermore, the operator is at risk of forgetting the lifting apparatus in the lifted position after having clamped the wheel on the support shaft, with the high risk of starting the balancing machine without having lowered the lifting apparatus.

Therefore, an object of the present invention is to overcome the disadvantages of the prior art and to improve the features thereof, providing a lifting apparatus which allows an operator to lift, and generally move, a vehicle wheel with a minimum of effort. Another object of the invention is to provide a lifting apparatus which is simple and economical but which is highly reliable and safe to use. Another object of the invention is to provide a lifting apparatus which can be connected to a balancing machine which allows operation with safety and speed for balancing vehicle wheels, and in particular for balancing a plurality of identical vehicle wheels.

STATEMENT OF INVENTION

According to a first aspect, a lifting apparatus according to the present invention comprises a wheel support which is selectively movable in order to lift or lower a vehicle wheel which is positioned thereon. An actuator group is connected to the wheel support in order to actuate the lifting and lowering thereof. A control unit is operationally connected to the actuator group in order to control the actuation of the actuator group. A lifting sensor member is provided to detect the height of the wheel support. The control unit may transmit at least one actuation instruction and bring about the actuation of the actuator group in order to lift the wheel support from a lowered rest position to a predetermined lifting position. The predetermined lifting position is detected by the lifting sensor member so that, when it is reached, the lifting of the wheel support is interrupted. The predetermining of the lifting position allows replication, for example, in succession, of the lifting operations for vehicle wheels which are identical to each other without it being necessary to determine, from time to time for each wheel, the optimum lifting position for carrying out subsequent operations, such as balancing, assembly or disassembly of the tyre, or any other operation which requires that the vehicle wheel be lifted off the ground. Furthermore, the direct detection of the position of the wheel support allows a precise measurement to be obtained both in respect of the lifting of the wheel at any time and of the effective reaching of the predetermined lifting position. On the contrary, the known systems which detect the position of the tyre of the wheel are imprecise and are subjected to errors owing to the irregular nature of the tyre, both as a result of the production characteristics thereof and owing to the wear state thereof.

The actuator group of the lifting apparatus preferably comprises a motor which is connected to articulated quadrilateral type articulation means which are actuated by an actuator. The articulated quadrilateral type articulation means allow a lifting mechanism to be produced with only rotation joints and without creeping components.

Preferably, the lifting sensor member is mounted on the quadrilateral type articulation means so as to directly detect the rotation thereof and to increase the precision of the measurement of the height reached by the lifting apparatus.

According to another aspect, the lifting apparatus comprises at least one manual control member which is operationally connected to the control unit. The manual control member is capable of selectively bringing about the actuation of the actuator group and lifting or lowering the wheel support to a height which is manually predetermined by an operator. The manual control of the lifting apparatus allows the operator to position a vehicle wheel precisely at the desired height on the basis of the type of operation to be carried out thereon. The final lifting position reached manually may then be stored in order to be used as a predetermined lifting position during subsequent use of the lifting apparatus.

Preferably, the manual control member comprises at least one lifting sensor which is capable of transmitting a proportional signal to the control unit so as to control the lifting or lowering of the wheel support at a speed or acceleration which are proportional to the proportional signal of the lifting sensor. In this manner, it is possible to provide an auxiliary lifting means for an operator, which reduces or eliminates the weight of the wheel, while leaving him the possibility of intuitively adjusting the speed or acceleration for lifting or lowering the vehicle wheel in accordance with the pressure applied to the manual control member.

Preferably, the lifting sensor is a pressure sensor which is connected to a handle which can be held by the operator during the manual operation of the lifting apparatus. The pressure sensor is capable of detecting the pressure which the operator applies to the handle and of controlling the lifting or lowering of the wheel support at a speed or acceleration which are proportional to that pressure. This feature is particularly advantageous for providing an ergonomic lifting apparatus which is easy to use. Furthermore, the same handle can be used by the operator in order to carry out other operations in addition to the assisted lifting or lowering action of the vehicle wheel, such as, for example, the movement in the horizontal of the wheel support in order to move towards or away from the support shaft of a balancing machine which is connected to the lifting apparatus.

According to another aspect, the lifting apparatus to which the present invention relates can be connected to a balancing machine for a vehicle wheel. Such a balancing machine generally comprises a support shaft which is capable of receiving a vehicle wheel and a clamping member which is capable of selectively clamping the vehicle wheel on the support shaft. The lifting apparatus is provided to receive a clamping signal which indicates the occurrence of clamping of the vehicle wheel on the support shaft of the balancing machine, and to consequently bring about the automatic lowering of the wheel support as far as the lowered rest position. As soon as such automatic lowering of the wheel support has been detected, the clamping of the vehicle wheel on the balancing machine allows a substantial increase in speed of the balancing operations.

Preferably, such a lifting apparatus is also provided to receive a stop signal which indicates when the balancing operations of the balancing machine are finished or are stopped for any reason. In that case, there is brought about the automatic lifting of the wheel support as far as the predetermined lifting position in such a manner that it is readily possible to disassemble the wheel from the balancing machine and to place it on the wheel support with a substantial time saving with respect to a manual operation.

Preferably, the predetermined lifting position to which the wheel support is lifted following the stoppage of the operations of the balancing machine corresponds to the position in which the lifting apparatus was at the time of the receipt of the preceding clamping signal. The speed of the operations of disassembly and lowering of the vehicle wheel are thereby further increased.

The invention also relates to a method of lifting a vehicle wheel with a lifting apparatus of the type set out above. In particular, the method comprises the steps of:

positioning a vehicle wheel on the wheel support of the lifting apparatus which is positioned in a lowered rest position, transmitting to the actuator group which is connected to the wheel support an actuation instruction in order to lift the wheel support, transmitting to the actuator group an instruction for deactivating the lifting action of the wheel support when a predetermined lifting position, which is measured by the lifting sensor member which is mounted on the actuator group, is reached.

BRIEF DESCRIPTION OF THE DRAWINGS

These features and other features and advantages will be appreciated more clearly from the following description of a preferred embodiment which is given by way of non-limiting example, with reference to the appended Figures in which.

DETAILED DESCRIPTION

Figure 1:
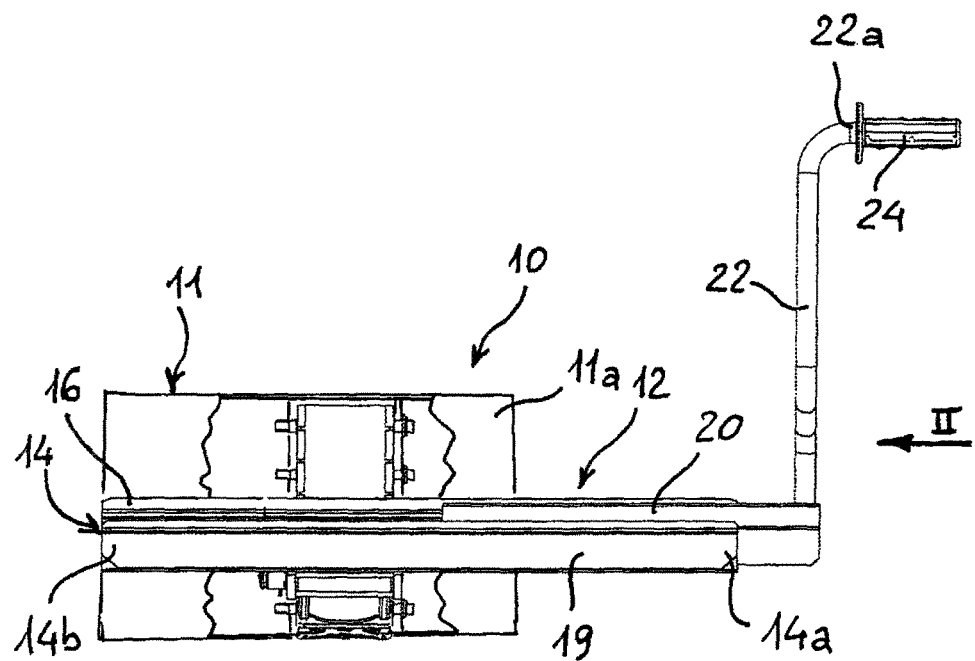
FIG. 1 is a front view of a lifting apparatus for vehicle wheels according to the present invention, in the lowered rest position in which the casing is partially sectioned in order to show the internal mechanisms.
Figure 2:
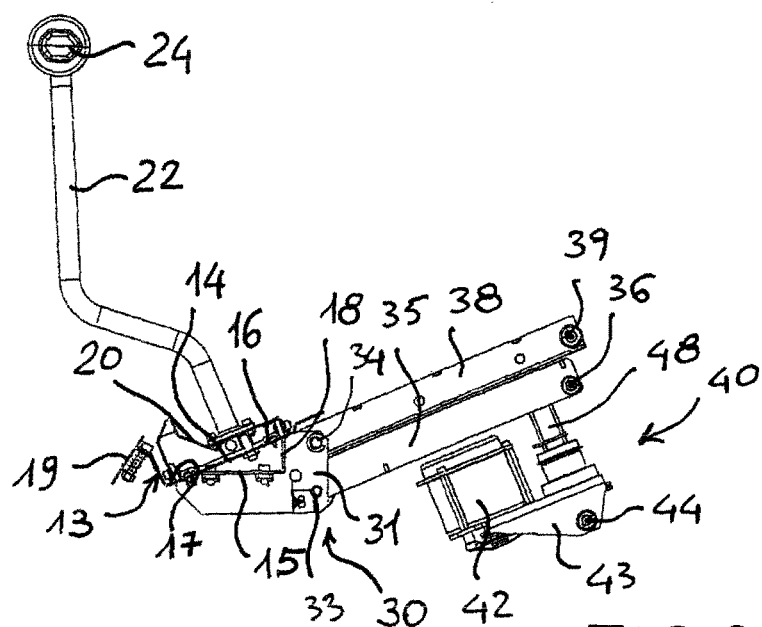
FIG. 2 is a side view of the lifting apparatus in the lowered rest position, in accordance with the arrow II of FIG. 1.

With reference to FIGS. 1 to 4, a lifting apparatus for vehicle wheels comprises a basic structure 10 which is covered by a casing 11 and to which there is articulated a lifting platform 12 for a vehicle wheel (not illustrated). The lifting platform 12 comprises a profile-member 14 having an inclined wall 16, to the back of which there is fixed a wedge-like support 18 which defines a lower horizontal wall 15 for the lifting platform 12. The inclined wall 16 has, along a lower corner 17 thereof, a raised step 13, from which there projects a ramp 19 which facilitates the travel of a vehicle wheel as far as the positioning thereof on the lifting platform 12 when the platform is in the lowered rest position thereof which is illustrated in FIGS. 1 and 2.

There is mounted on the profile-member 14 so as to slide a support slide 20 which is substantially of V-like form and on which the vehicle wheel will be directly supported. The horizontal sliding of the support slide 20 from a lifting position located near the end 14a of the profile-member 14, on the right in FIG. 1, to an operating position (not illustrated) located at the opposite end 14b of the profile-member 14, on the left in FIG. 1, allows, for example, the vehicle wheel to be moved towards a support shaft of a balancing machine, or the like, as will be better described below. Preferably, the horizontal sliding of the support slide 20 is detected by a position sensor, for example, which is connected to the system for moving the slide 20, in the case of automated movement being provided, and/or by travel limit sensors which are located at or in the vicinity of the ends 14a, 14b, of the profile-member 14. Those sensors are of the generally known type and may comprise optical, magnetic, electromechanical, resistive, capacitive sensors, and sensors of any other type suitable for the purpose.

Figure 5:
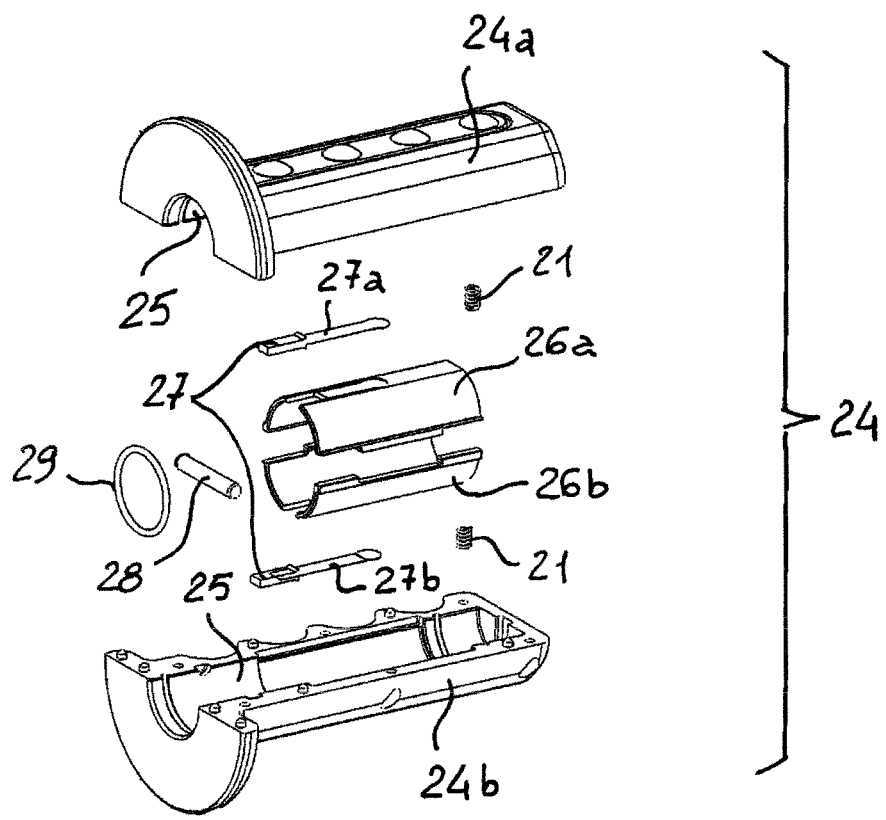
FIG. 5 is an exploded view of a handle of the lifting apparatus of FIGS. 1 to 4.

There is fixed to the support slide 20 an operating lever 22 which extends substantially upwards and which terminates in a horizontal end portion 22a which is covered by a handle 24 which is used by an operator to operate the lifting apparatus and to press the support slide 20 on the profile-member 14. The handle 24, as can better be seen in FIG. 5, comprises two half-shells 24a, 24b which can be connected by means of screws, joints, adhesive or other similar means. The half-shells 24a, 24b generally define a cylindrical cavity 25 having a substantially uniform diameter which corresponds to the external diameter of the end portion 22a of the operating lever 22. Along a central portion of the cylindrical cavity 25, each half-shell 24a, 24b comprises a respective insert 26a, 26b, under which there are mounted, in diametrically opposed positions, two respective pressure sensors 27a, 27b which generally define a sensor system 27. The pressure sensors 27a, 27b are arranged one above and the other below with respect to the position taken up by the handle 24 in the assembled configuration, in a state engaged on the end portion 22a of the operating lever 22 and blocked at that location by means of a pin 28. A packing 29 prevents the introduction into the handle 24 of dirt, water, grease or other undesirable substances. A pair of springs 21 is provided so as to maintain the end portion 22a substantially centred with respect to the pressure sensors 27a, 27b in the absence of any pressure on the handle, in order to prevent false signals at the sensors. In the example of FIG. 5, the pressure sensors 27a, 27b are preferably piezometric sensors but naturally they can be replaced with or integrated in other types of sensors known to the person skilled in the art, such as, for example, extension gauge type sensors, magnetic sensors, induction type sensors, mechanical sensors with microswitches, optical sensors or any other type, which generally constitute the sensor system 27 and which are capable of detecting the forces applied to the handle 24 by an operator for actuating the lifting apparatus, as will be better described below. The pressure sensors 27a, 27b, and in general any type of sensor used in the handle 24, may also be mounted in a manner very different from the one illustrated by way of example in FIG. 5. For example, the sensors could be applied directly to the surface of the cylindrical cavity 25, without any need for providing the inserts 26a, 26b, thereby being arranged directly in contact with the end portion 22a of the operating lever 22. The sensors could also be directly countersunk in the plastics material of the handle 24 during the production thereof. The sensors could also be applied to the external surface of the handle 24 or could project outwards therefrom. The configuration of the handle 24 illustrated in FIG. 5 is given purely by way of example since the specific materials and components, as for the geometry thereof, could also be very different from those described and illustrated by way of example, for example, as a result of the type of sensors used.

Figure 7:
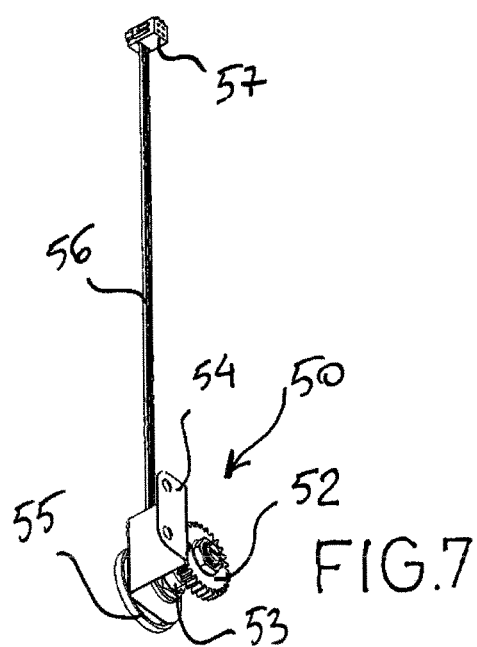
FIG. 7 is a perspective view of a lifting sensor group of the lifting apparatus of FIGS. 1 to 4.

Still with reference to FIGS. 1 to 4, the lifting platform 12 is connected to the basic structure 10 with an articulated quadrilateral type configuration which allows the movement of the lifting platform 12 in such a manner that it always remains substantially parallel with the ground. In greater detail, there is fixed to the rear face of the profile-member a lifting structure 30 which comprises two L-shaped brackets 31 which are mutually parallel and which extend so as to support a pair of horizontal bars 32 which are fixed to the profile-member 14. There are mounted on the two brackets 31, in a retracted position with respect to the profile-member 14, two lower and upper articulation pins 33 and 34, respectively, which are mounted with the axis thereof horizontal and substantially in vertical alignment with each other. There are mounted in an oscillating manner on the lower articulation pin 33 the ends 35a of two parallel articulation levers 35, the opposing ends 35b of which are mounted so as to oscillate on the basic structure 10 by means of another horizontal articulation pin 36. The rotation of the articulation levers 35 is measured by a lifting sensor system which is generally designated 50 and in which a toothed wheel 51 which is keyed on an end of the articulation pin 36, on the left in FIG. 4, engages with a corresponding toothed wheel 52, which can be better seen in FIG. 7, preferably with a gearing-up relationship. The toothed wheel 52 is keyed to a shaft 53 which is supported by a bracket 54 which is fixed to the side of one of the L-shaped brackets 31. The shaft 53 causes a potentiometer 55 to rotate, which takes up an electrical resistance value which is proportional to the rotation of the toothed wheels 51 and 52 and therefore the rotation of the articulation levers 35 with respect to the L-shaped brackets 31. The electrical resistance value is detected by an electric circuit which comprises the electrical connection cable 56 which is connected to the potentiometer 55 and which is preferably provided at the end thereof with a rapid connector or terminal 57.

There is mounted in an oscillating manner on the upper articulation pin 34 the end 38a of an arm 38, which is preferably box-shaped in order to afford good resistance and whose opposing end 38b is articulated for oscillation to the basic structure 10 by means of another horizontal articulation pin 39 which is substantially vertically aligned with the articulation pin 36 of the articulation levers 35. In the lowered rest configuration of the lifting apparatus, the arm 38 is substantially parallel and near the articulation levers 35, as is clearly visible in FIG. 2. That configuration of the lifting apparatus, which is particularly compact, further allows the arm 38 to be inclined with substantial continuity with respect to the inclination of the wall 16 of the profile-member 14, and in a planar manner in alignment with an upper wall 11a of the casing 11 of the basic structure 10. That general inclined configuration, which is continuous in a planar manner, of a greater portion of the upper surface of the lifting apparatus makes it easy to position thereon a vehicle wheel which also travels on the ramp 19 of the profile-member 14 at a given speed.

Figure 6:
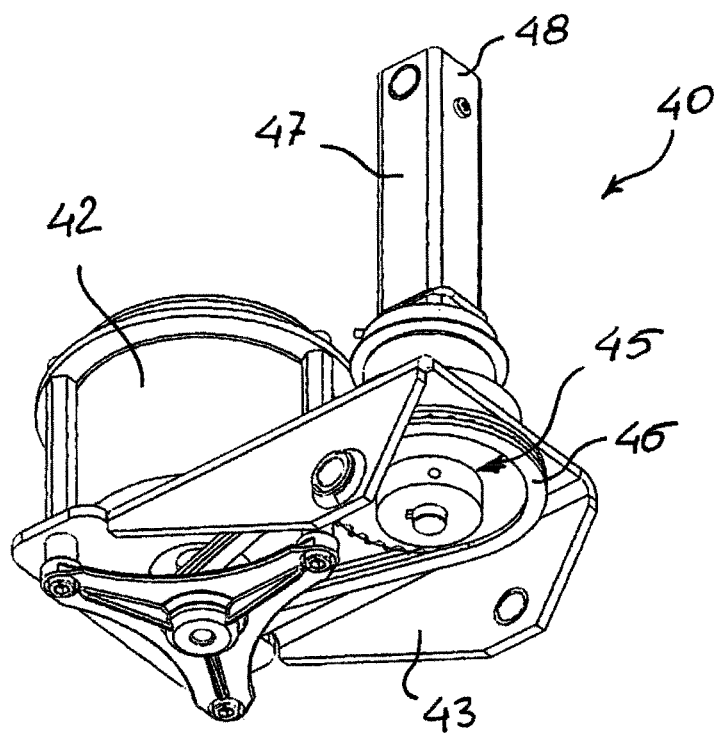
FIG. 6 is a perspective view of an actuator group of the lifting apparatus of FIGS. 1 to 4.

Inside the basic structure 10, under the articulation levers 35 and substantially centred with respect to each other, there is provided an actuator group 40 which can be seen in greater detail in FIG. 6. The actuator group comprises a motor 42, preferably an electric motor, which is fixed to an oscillating support plate 43 which is mounted for oscillation on the basic structure 10 by means of a horizontal pin 44. The motor 42 controls, via a transmission 45, preferably but in a non-limiting manner constructed with a single roller chain 46, or a toothed belt, a gearing or another similar solution, an actuator 47, preferably but in a non-limiting manner a linear actuator of the screw type with reversible operation, which is also fixed to the oscillating support plate 43. An end 48 of the actuator 47 is connected in an articulated manner to the arm 38 via a pin 49 so as to control the rotation of the arm 38, with respect to the basic structure 10, about the articulation pin 39.

Figure 3:
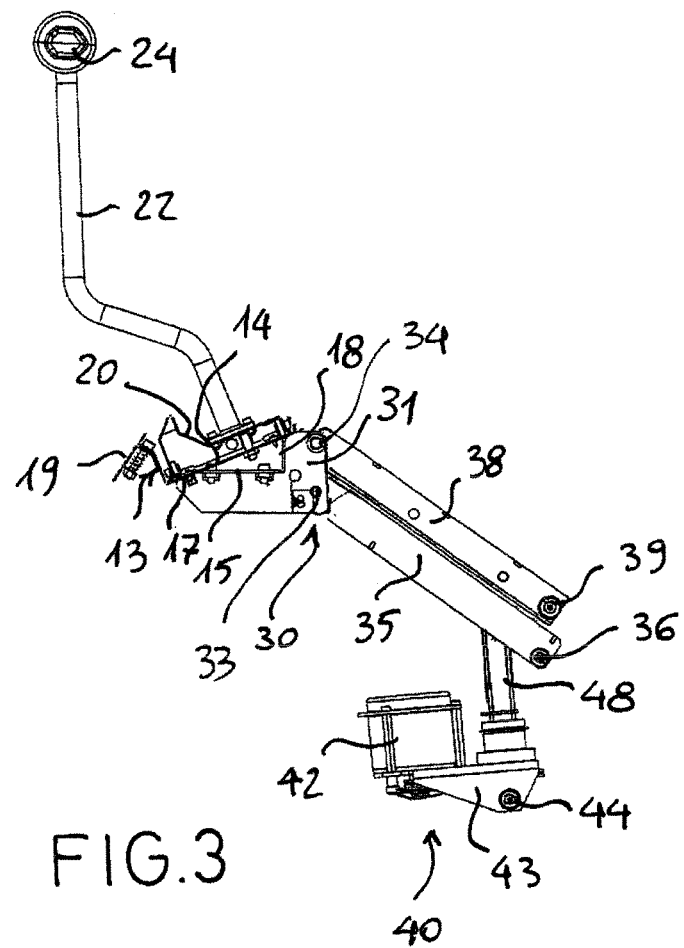
FIG. 3 is a side view similar to FIG. 2, with the lifting apparatus in the maximum lifting position.
Figure 4:
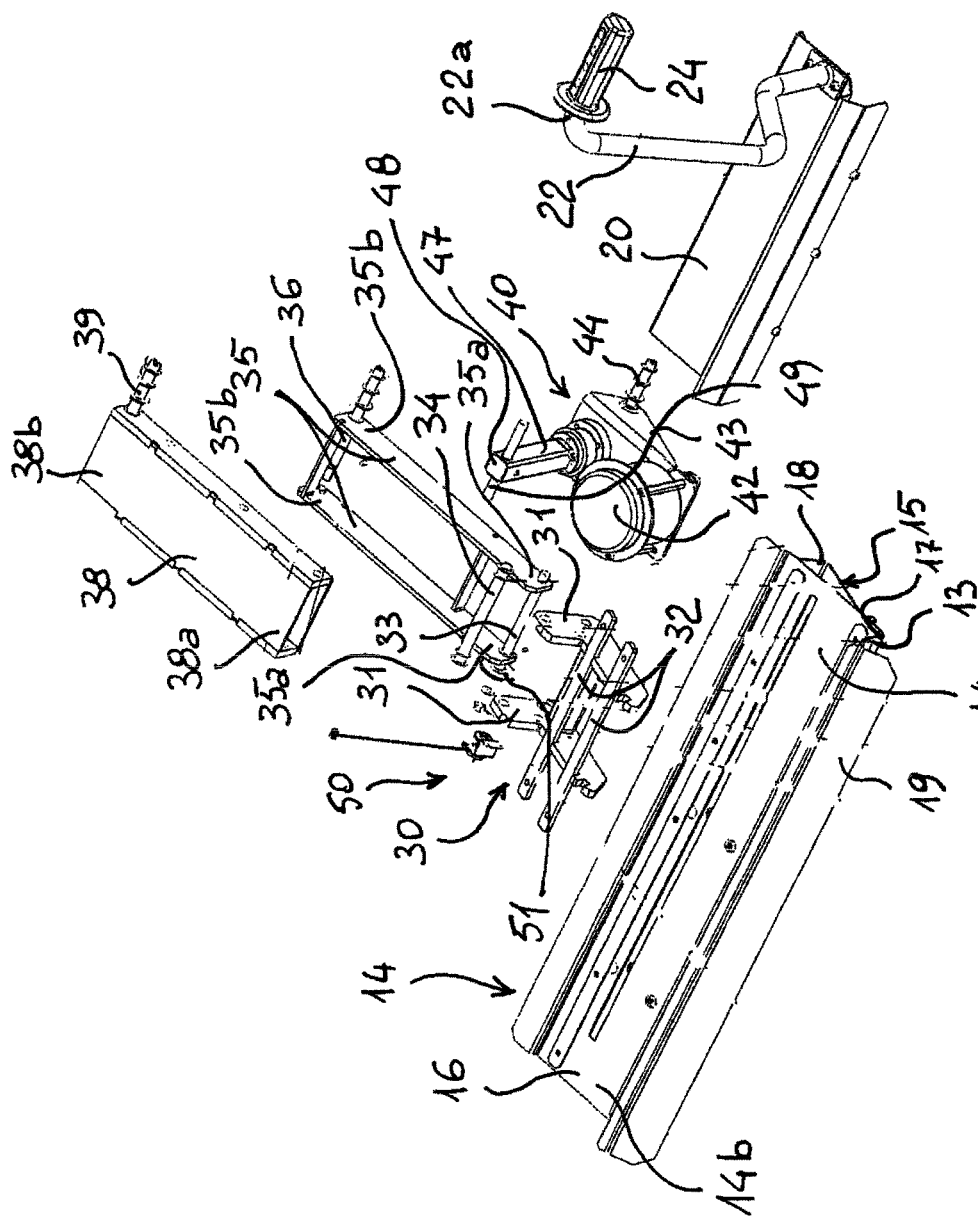
FIG. 4 is an exploded perspective view of the lifting apparatus of FIGS. 1 to 3.
Figure 8:
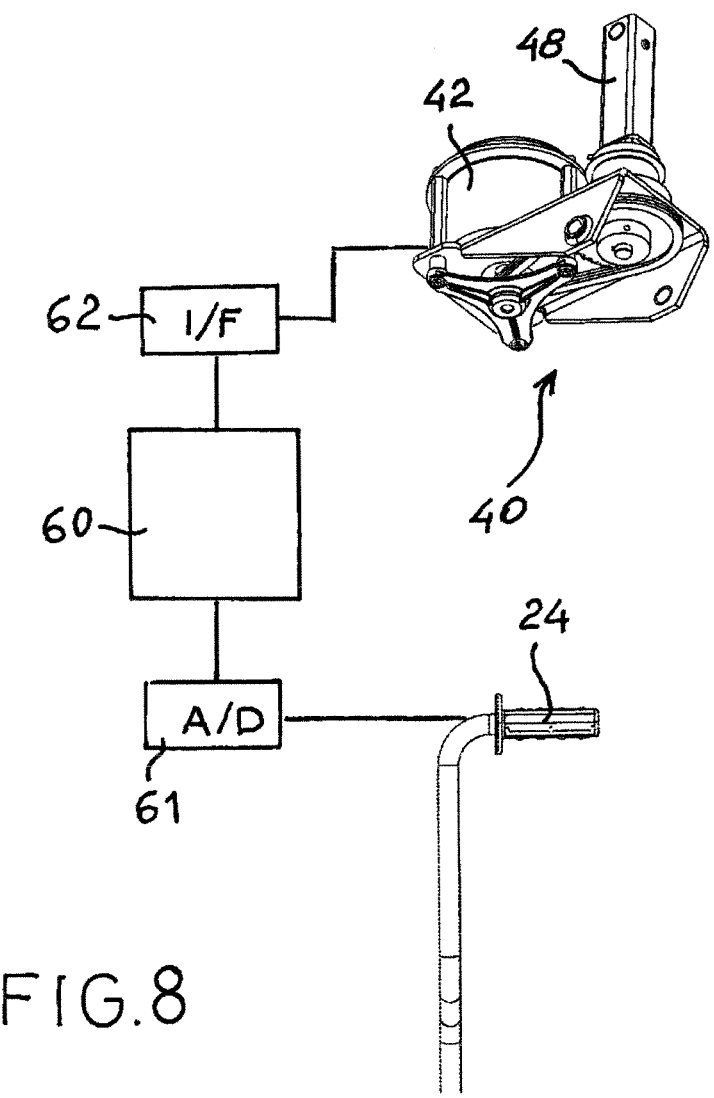
FIG. 8 is a schematic diagram of the control system of the lifting apparatus in an isolated configuration thereof.

In an autonomous configuration thereof, as schematically illustrated in FIG. 8, the lifting apparatus comprises an electronic control system 60 which receives at the input the signals from the sensors 27 which are mounted on the handle 24, which signals are processed in known manner by an analogue/digital converter 61. The electronic control system 60 is connected at the output to the actuator group 40, with the interposition of a controller group 62 acting as an interface with the motor 42. The electronic control system 60 is configured by means of hardware connections and/or software programming so that a pressure applied to the lower portion or to the upper portion of the handle 24 (or the flexion of the handle 24 with respect to the control lever 22, resulting from such pressure on the lower portion or upper portion of the handle 24) detected by the sensors 27a, 27b brings about the actuation of the actuator group 40 so as to cause the arm 38 to rotate, in order to bring about the lifting or lowering of the lifting platform 12, respectively. In the absence of pressure on the handle 24, the electronic control system 60 maintains the actuator group 40 in the position which is reached at that time. The lifting apparatus is provided with travel limit sensors (not illustrated) which signal to the electronic control system 60 both that the lowered rest position which is illustrated in FIG. 2 has been reached and that a predetermined position of maximum lifting which is illustrated in FIG. 3 has been reached.

In order to use the lifting apparatus, an operator places a vehicle wheel on the lifting platform 12, causing it to travel on the ramp 19 until it rests in stable equilibrium on the V-shaped support slide 20. By the handle 24 being operated, the operator then carries out the action of lifting the lifting platform 12 in order to lift the vehicle wheel which is positioned thereon, thereby applying an initial pressure to the lower portion of the handle 24, or bringing about an initial flexion which is produced by that initial pressure. The initial pressure is detected by the sensors 27a, 27b which transmit a signal, which indicates that initial pressure and which is proportional thereto, to the electronic control system 60, which provides for the control of the actuator group 40 so that it produces the actuation of the motor 42 and the resultant lifting action, via the pressure applied by the actuator 47 to the arm 38, of the lifting platform 12. This in turn brings about the lifting of the operating lever 22 which is connected to the lifting platform, and therefore the handle 24 which is positioned at the end thereof. If the operator continues to apply a lifting pressure to the handle 24, the electronic control system 60 consequently continues to receive signals from the sensors 27a, 27b and to control the actuator group 40 which carries out the lifting of the lifting platform 12 on which the vehicle wheel is supported. If the operator interrupts the lifting pressure on the handle 24, for example, because it has reached the desired lifting height for the vehicle wheel, the signal transmitted from the sensor group 27 to the electronic control system 60 is interrupted or is reset, which system interrupts the actuation of the actuator group 40 which then stops in the lifting position reached at that time.

If the operator, still operating the handle 24, then carries out the action of lowering the lifting platform 12 in order to lower the vehicle wheel which is positioned thereon, thereby applying a pressure to the upper portion of the handle 24, or bringing about a flexion thereof which is produced by that pressure, the electronic control system 60 operates in the opposite manner to that described above, causing the actuation of the actuator group 40 so as to retract the actuator 47 and to lower the arm 38 and the whole of the lifting platform 12. A safety system which is not illustrated in the Figures is produced, for example, by means of proximity sensors, photo-electric cells, electromechanical devices such as microswitches, or the like, intervenes by interrupting the lowering of the lifting platform 12 if an extraneous body, for example, a foot of the operator, moves between the ground and the lifting platform 12, in order to prevent it from being crushed.

It is further possible to provide for a safety system in order to prevent the vehicle wheel from being excessively lifted. In addition to a travel limit sensor for maximum elevation, or as an alternative thereto, it is possible to make use of a mechanical travel limit which is provided as the support of the lifting levers 35 on the arm 38 in the maximum lifting position, illustrated by way of example in FIG. 3. That functionality is made possible in that the articulation pins 33 and 34 and 36 and 39 of the lifting levers 35 and the arm 38, respectively, are moved very close together in a vertical direction and therefore allow only a limited rotation arc before the lifting levers 35 and the arm 38 interfere with each other, preventing further rotation. Alternatively or additionally to the systems indicated here, it is possible to provide for a safety system which is connected to the wheel protection screen of a balancing machine, as will be better described below, in order to prevent the vehicle wheel from striking him during the lifting action. It is possible to use for this purpose a bracket which is provided with microswitches, or other sensors of known type (optical, mechanical, inductive, resistive, etc.) which causes a signal to be released when it is struck by a vehicle wheel during the lifting thereof.

The activation of the actuator group 40 is calibrated proportionally to the signal detected by the sensor group 27 so as to make use of the actions of the operator on the handle 24 which can thereby control the movement of the vehicle wheel, lifting it and lowering it freely with an effort which is practically zero. Naturally, the sensitivity of the system may be calibrated so as to leave the operator a desirable sensation of weight, which is evident to a greater or lesser extent, in accordance with preferences. For example, the electronic control system 60 of the lifting apparatus could be programmed so as to generate an operation which is slightly different from that indicated above and in which the operator always has to apply a minimum pressure to the lower portion of the handle 24, including for maintaining the vehicle wheel in a lifted state. In that case, releasing the handle 24 or relaxing the pressure on the lower portion below a given value would cause the lowering, though gradual and controlled, of the vehicle wheel supported on the lifting platform 14.

The manual control of the lifting apparatus may allow the operator to position a vehicle wheel precisely at the height desired, on the basis of the type of operation to be carried out thereon. The final lifting position reached manually may then be stored in order to be used as a predetermined lifting position during subsequent use of the lifting apparatus.

Figure 9:
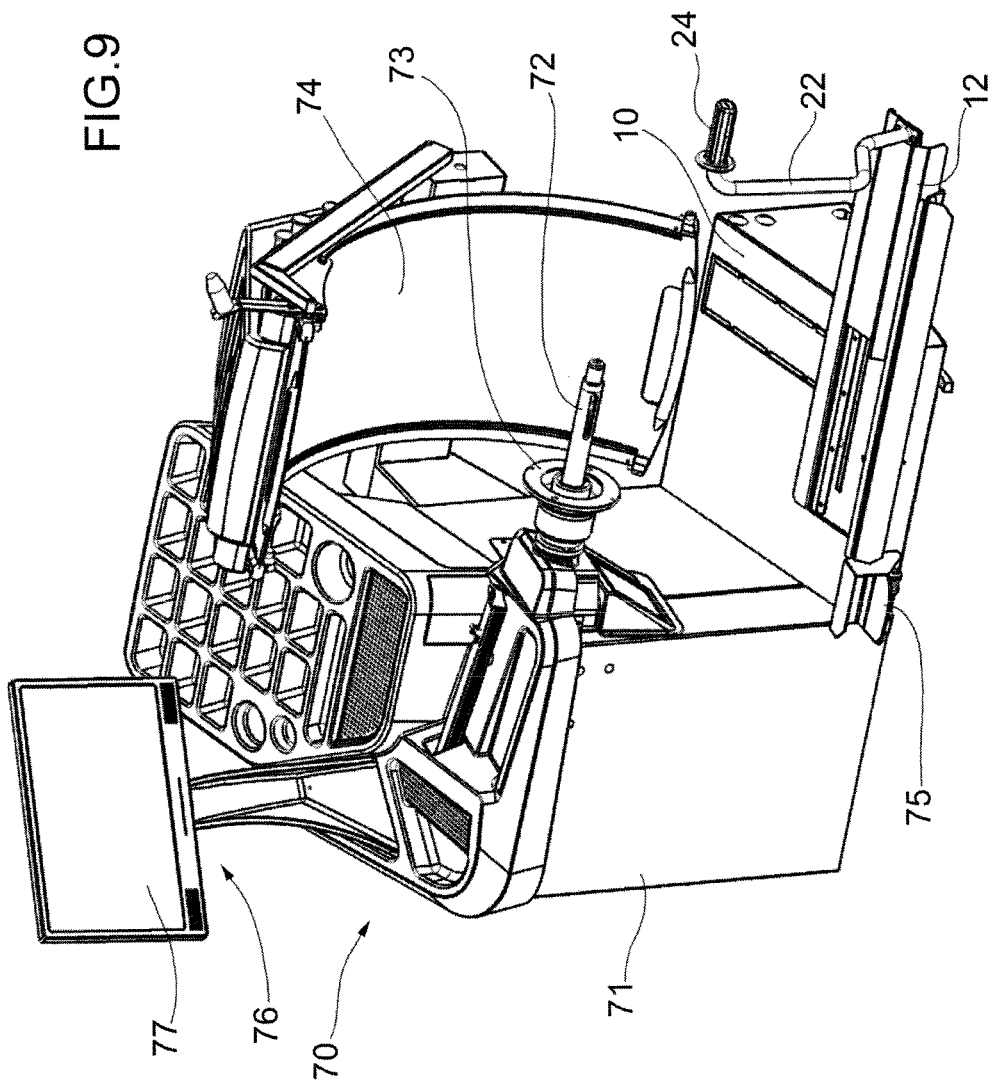
FIG. 9 is a perspective view of a lifting apparatus of the present invention connected to a balancing machine.

In a particular embodiment, illustrated in FIG. 9, the lifting apparatus is connected and integrated in a balancing machine 70 of the generally known type, comprising a main body 71, to which there is connected in a stable manner the basic structure 10 of the lifting apparatus. The balancing machine comprises a support shaft 72 for a vehicle wheel to be balanced. A clamping device 73 selectively provides for blocking the vehicle wheel on the balancing machine. A wheel protection screen 74 may be selectively moved for the purpose of protection during the balancing operation of the vehicle wheel. A brake pedal 75 controls the stopping of the rotation of the support shaft 72. A control system 76 of the balancing machine comprises an electronic processor (not illustrated) and a user interface system 77, for example, a touch-sensitive screen or other known means for the interaction of the operator with the provided functions which can be activated as a result of the software programme loaded on the electronic processor. The control system 76 of the balancing machine 70 communicates and is coordinated with the electronic control system 60 of the lifting apparatus. Alternatively, the control system 76 of the balancing machine 70 and the electronic control system 60 of the lifting apparatus are integrated in a single, more complex general control system which may also comprise, where applicable, remote connections with respect to other data management nodes.

In that configuration, the lifting apparatus may interact in an integrated manner with the operation of the balancing machine 70, using some features and improving the functionality thereof. For example, the signals from the brake pedal 75 of the balancing machine 70 may also be used to activate specific functions of the lifting apparatus. A particular example, though non-limiting, is to provide the permission for using the handle 24 on the part of the operator in order to actuate the lifting platform 12 only when the brake pedal 75 is pressed. At the start of the balancing machine, a pressure of the brake pedal 75 may bring about the automatic lowering of the lifting platform 12, if it is in a lifted position. Another example, which is still non-limiting, is to use the brake pedal 75 with a pulse type control in order to move the lifting apparatus automatically to a predetermined height, for example, to a predetermined height which is adequate for centering a vehicle wheel about the support shaft 72 of the balancing machine 70. A function of this type is advantageous when it is necessary to balance two or more identical vehicle wheels one after the other, for example, all the wheels of the same vehicle. In this case, the predetermined height may be fixed and stored in the control system both automatically, for example, by reading the diameter of the vehicle wheel by means of a known reading system, for example, by means of the use of a bracket or another mechanical element (not illustrated in the Figures), which is connected to a rotation sensor, for example, a potentiometer, the bracket being caused to rotate by the contact with a vehicle wheel when the operator positions the wheel on the lifting platform 12; an automatic system for detecting the dimensions of a wheel of this type is, for example, set out in EP-A1-1982851; or the automatic reading of the diameter may be carried out by any other type of known sensor system (optical, mechanical, inductive, resistive, etc.), or, in the alternative, may be carried out manually, after an action by the operator once the first vehicle wheel of the series has been centred about the support shaft 72. According to another example of interaction, the lifting apparatus is enabled and disabled in accordance with the position taken up by the wheel protection screen 74. The manual control of the lifting apparatus may therefore allow the operator to position a vehicle wheel precisely at the height desired on the basis of the type of operation to be carried out thereon. The final lifting position reached manually may then be stored in order to be used as a predetermined lifting position during subsequent use of the lifting apparatus, for example, for the subsequent balancing of a plurality of identical wheels of the same vehicle.

Figure 10:
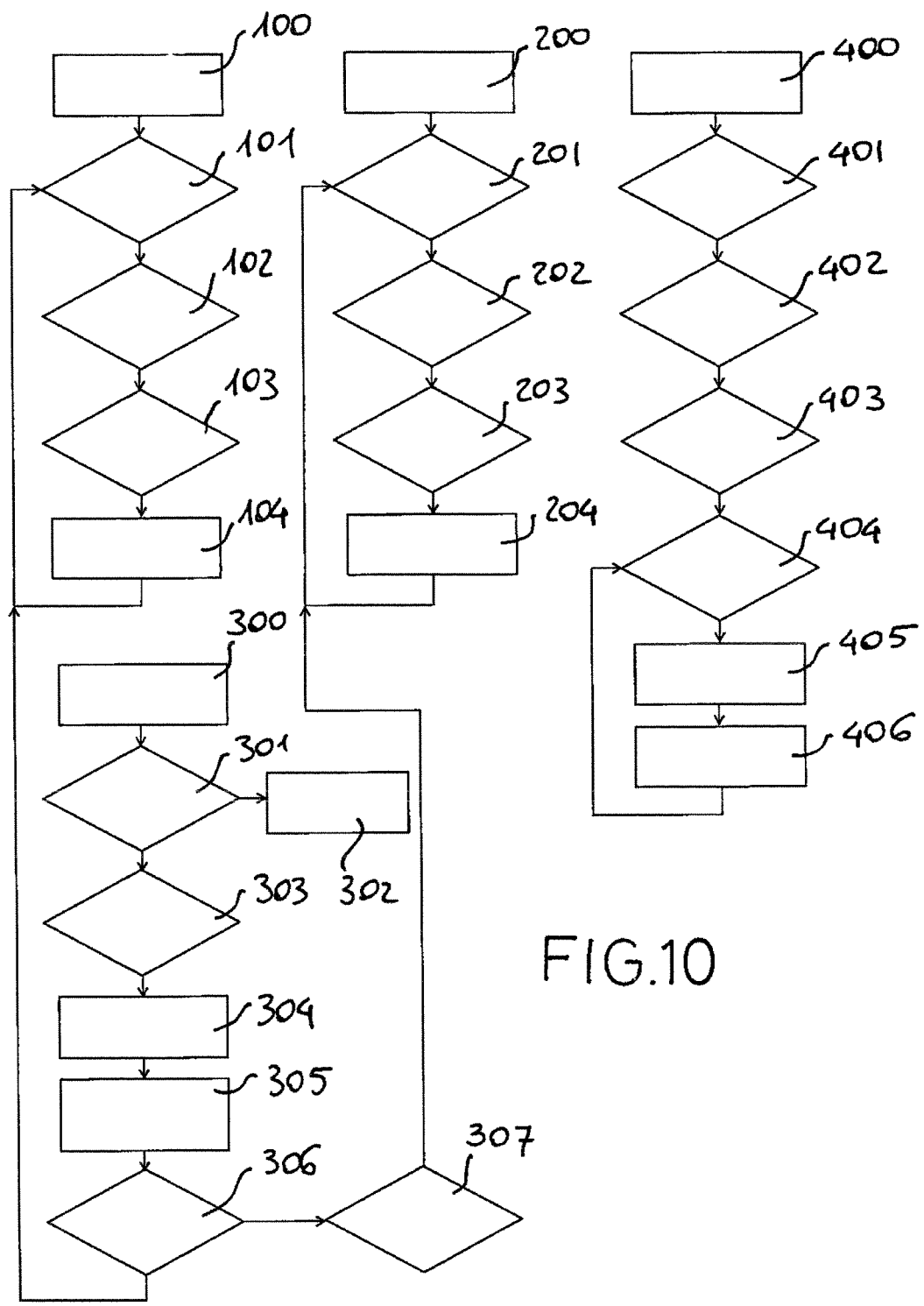
FIG. 10 is a flow chart of an example of an integrated operating method of a lifting apparatus which is associated with a balancing machine.

With reference to the flow chart of FIG. 10, there is described an example of an integrated operating method of a lifting apparatus as described, which is associated with a balancing machine of the type mentioned above.

When the balancing machine and the lifting apparatus connected thereto and/or integrated therein are started up, the system remains waiting for a signal from the handle 24, from the brake pedal 75 or from a push-button or balancing start instruction, for example, shown by the user interface 77.

If the system receives a lifting signal (step 100) from the handle 24, it is first checked whether the operation via the handle 24 has been activated (step 101). In a positive case, it is checked whether the wheel protection screen 74 is lifted (step 102). In a positive case, it is checked whether the lifting apparatus has reached the upper travel limit position (step 103). In a negative case, there is actuated the lifting action proportional to the force or pressure or flexion applied to the handle 24 (step 104), with continuous monitoring of the operating conditions by continuously carrying out the checks of all the steps 101, 102, 103, until verifying one of the stop conditions or until the lifting signal stops.

In the case in which the system receives a lowering signal (step 200) from the handle 24, it is first checked whether the operation via the handle 24 is activated (step 201). In a positive case, it is checked whether the wheel protection screen 74 is lifted (step 202). In a positive case, it is checked whether the lifting apparatus has reached the lower travel limit position (step 203). In a negative case, there is actuated the lowering action proportional to the force or pressure or flexion applied to the handle 24 (step 204), with continuous monitoring of the operating conditions by continuously carrying out the checks of all the steps 201, 202, 203, until verifying one of the stop conditions or until the lifting signal stops.

If the system receives a pulse type signal of the brake pedal 75 (step 300), the activation state of the handle 24 is checked (step 301). If the handle 24 is activated, it is deactivated (step 302). If it has not been activated, or when it no longer is, it is checked whether the wheel protection screen 74 is lifted (step 303). In a positive case, the handle 24 is activated (step 304), and then the positioning of the lifting platform 12 to a predetermined height is carried out (step 305). At this point, the system remains waiting for any instruction at the handle 24 (step 306). If there is brought about a lifting instruction at the handle 24, the system returns to carry out the method from the step 101 described above. If there is brought about a lowering instruction at the handle 24 (step 307), however, the system returns to carry out the method from the step 201 described above.

When the operator has reached the desired height of the vehicle wheel, so as to be able to centre it about the support shaft 72, he provides for movement of the support slide 20 towards the end of the profile-member 14, inserting the vehicle wheel on the support shaft 72, where it is blocked in known manner by activation of the clamping device 73. The clamping of the vehicle wheel may automatically bring about the return of the lifting apparatus to the lowered rest position, or vice versa, the release of clamping of the wheel may automatically bring about the return of the lifting apparatus to the operating lifting position, preferably the predetermined position which the lifting apparatus had reached during the action of insertion and the blocking of the vehicle wheel on the support shaft 72. The instruction for automatic return of the lifting apparatus to the operating lifting position, to the predetermined height, may also be brought about following a signal for ending the balancing operations, or also when those operations are finished or interrupted voluntarily or for any other reason.

If the balancing machine 70 is provided with an electromechanical clamping arrangement for the wheel, for example, of the type described in document U.S. Pat. No. 6,928,871 of Snap-on Equipment GmbH, it is possible to receive a clamping completion signal or a clamping release signal, from the on-board electronic unit of the balancing machine. However, in the case of a balancing machine of a more economical type, which is provided with a simple manual clamping system for the vehicle wheel, it is possible to configure the clamping flange, for example, with a pressure sensor, proximity sensor, a microswitch or the like, in order to receive information and to transmit significant signals which are substantially similar to those transmitted by a more complex balancing machine such as the one described above. Still with regard to the balancing machine of modest cost, it is possible to provide for configuring the blocking ring instead of the flange.

When the system receives a signal from a push-button or a balancing start instruction (step 400) in order to balance a vehicle wheel which is placed on the support shaft 72, it is checked whether the lifting apparatus is in the lowered rest position (step 401). In a positive case, it is checked whether the support slide 20 is in the remote position from the end of the profile-member 14 (step 402). In a positive case, it is checked whether the vehicle wheel is clamped on the support shaft 72 (step 403). In a positive case, it is checked whether closure of the wheel protection screen 74 has taken place (step 404), then the instruction by means of the handle 24 of the lifting apparatus is disabled (step 405) and finally the balancing operation proper is started (step 406), maintaining the monitoring thereof in the steps 404 and 405 until the end of the balancing operations.

All that has been described above with reference to a balancing machine may naturally also be used in the case of other machines for processing vehicle wheels, and in particular for tyre changing machines. In those machines, it is also possible to connect a lifting apparatus having the features described above and to be able to receive significant signals from the machine connected thereto. In particular, any machine for processing vehicle wheels, and in particular tyre changing machines, may transmit signals indicating the occurrence of clamping of a vehicle wheel, and may transmit significant signals relating to the occurrence of completion or interruption of the peculiar operations of each machine.

Naturally, the principle of the invention remaining the same, the forms of embodiment and details of construction may be varied widely with respect to those described and illustrated, without thereby departing from the scope of the invention.

The invention claimed is:

1. A lifting apparatus for a vehicle wheel comprising a wheel support which is selectively movable in order to lift or lower a vehicle wheel which is positioned thereon, an actuator group which is connected to the wheel support in order to actuate the lifting and lowering thereof, a control unit which is operationally connected to the actuator group in order to control the actuation of the actuator group, a lifting sensor member being provided to detect the height of the wheel support, at least one actuation instruction of the control unit bringing about the actuation of the actuator group in order to lift the wheel support from a lowered rest position to a predetermined lifting position, which is detected by the lifting sensor member.

2. A lifting apparatus for a vehicle wheel according to claim 1, wherein the actuator group comprises a motor which is connected to articulated quadrilateral type articulation means which are actuated by an actuator.

3. A lifting apparatus for a vehicle wheel according to claim 2, wherein the lifting sensor member is mounted on the quadrilateral type articulation means.

4. A lifting apparatus for a vehicle wheel according to claim 1, comprising at least one manual control member which is operationally connected to the control unit in order to selectively bring about the actuation of the actuator group and to lift or lower the wheel support to a height which is manually predetermined by an operator.

5. A lifting apparatus for a vehicle wheel according to claim 4, wherein the manual control member comprises at least one lifting sensor which is capable of transmitting a proportional signal to the control unit so as to control the lifting or lowering of the wheel support at a speed or acceleration which are proportional to the proportional signal of the lifting sensor.

6. A lifting apparatus for a vehicle wheel according to claim 5, wherein the lifting sensor is a pressure sensor which is connected to a handle, the pressure sensor being capable of detecting the pressure which is applied to the handle by an operator and of controlling the lifting or lowering of the wheel support at a speed or acceleration which are proportional to the pressure applied to the handle by the operator.

7. A lifting apparatus for a vehicle wheel according to claim 1, which can be connected to a balancing machine or tyre changing machine for a vehicle wheel, comprising a support shaft which is capable of receiving a vehicle wheel and a clamping member which is capable of selectively clamping the vehicle wheel on the support shaft, the lifting apparatus being provided to receive a clamping signal which indicates the occurrence of clamping of a vehicle wheel on the support shaft of a balancing machine or tyre changing machine which is connected to the lifting apparatus, and to bring about the automatic lowering of the wheel support as far as the lowered rest position following receipt of the clamping signal.

8. A lifting apparatus for a vehicle wheel according to claim 7, which is provided to receive a stop signal which indicates when the operations of the balancing machine or tyre changing machine which is connected to the lifting apparatus are stopped, and to bring about the automatic lifting of the wheel support as far as the predetermined lifting position.

9. A lifting apparatus for a vehicle wheel according to claim 8, wherein the predetermined lifting position of the wheel support corresponds to the position in which the lifting apparatus was at the time of the receipt of a preceding clamping signal.

10. A method of lifting a vehicle wheel with a lifting apparatus according to claim 1, comprising the steps of:
  positioning a vehicle wheel on the wheel support of the lifting apparatus which is positioned in a lowered rest position,
  transmitting to the actuator group which is connected to the wheel support an actuation instruction in order to lift the wheel support,
  transmitting to the actuator group an instruction for deactivating the lifting action of the wheel support when a predetermined lifting position, which is measured by the lifting sensor member, is reached.

11. A method according to claim 10, further comprising the step of receiving a manual instruction in order to lift or lower the wheel support to a predetermined height manually by an operator.

12. A method according to claim 11, wherein the pressure applied by an operator to a handle brings about the lifting or lowering of the wheel support at a speed or acceleration which are proportional to that pressure.

13. A method according to claim 11, wherein the final position reached by the wheel support at the end of the manual instruction of the lifting apparatus is stored in order to be used as a predetermined lifting position during subsequent use of the lifting apparatus.

14. A method according to claim 10, further comprising the step of detecting a signal relating to the occurrence of clamping of the vehicle wheel on a balancing machine or tyre changing machine which is connected to the lifting apparatus, and consequently transmitting to the actuator group which is connected to the wheel support an activation instruction for lowering the wheel support.

15. A method according to claim 10, further comprising the step of detecting a signal indicating the end of operations on a balancing machine or tyre changing machine which is connected to the lifting apparatus, and consequently transmitting to the actuator group which is connected to the wheel support an activation instruction for lifting the wheel support as far as the predetermined lifting position.

16. A balancing machine or tyre changing machine for a vehicle wheel, comprising a lifting apparatus according to claim 1.

* * * * *